United States Patent [19]

Shih

[11] 4,241,123
[45] Dec. 23, 1980

[54] NON-WOVEN NETTING

[76] Inventor: Seng C. Shih, 60, Lane 63, Chung Cheng Rd., Luchow Hsiang, Taipei Hsien, Taiwan

[21] Appl. No.: 960,720

[22] Filed: Nov. 14, 1978

[51] Int. Cl.³ .............................................. B32B 5/12
[52] U.S. Cl. .................... 428/105; 156/167; 156/181; 264/DIG. 81; 264/167; 264/248; 428/107; 428/255; 428/296
[58] Field of Search ............... 428/105, 107, 108, 112, 428/224, 225, 247, 255, 296; 156/167, 181, 306; 264/DIG. 81, 167, 248

[56] References Cited

U.S. PATENT DOCUMENTS

| 3,019,147 | 1/1962 | Nalle | 428/255 |
| 3,507,736 | 4/1970 | Plymale | 156/441 |
| 3,720,569 | 3/1973 | Kimble | 428/108 |
| 3,744,529 | 7/1973 | Jorda et al. | 428/107 |
| 3,952,127 | 4/1976 | Orr | 428/255 |

Primary Examiner—James J. Bell
Attorney, Agent, or Firm—Cushman, Darby & Cushman

[57] ABSTRACT

A new fast method for making plastic netting without weaving or knitting. This non-woven netting is made by the cohesion of melting plastic monofilaments extruded by a T Die. Under the reciprocating movement of guide rollers, several groups of melting monofilaments are guided to be crossed, and the pressed and welded together on pressure silicone rollers. When necessary, other yarns or filaments can be added to be crossed, pressed and welded together, to increase the tensile strength of the netting. Generally, it is a kind of netting made by crossing one group of melting plastic monofilaments with other groups of melting plastic monofilaments or by other yarns under the pressing and welding process.

6 Claims, 6 Drawing Figures

NON-WOVEN NETTING

BRIEF SUMMARY OF THE INVENTION

The use of netting is widely and popularly applied to mosquito nets, insect nets, bird nets, plant climbing nets, wind screens, filter screens, shade screens, etc. Usually such netting is either woven by loom or knitted by knitting machine. Due to the weaving or knitting process, the production is quite limited. In accordance with this invention netting is not woven or knitted but just rolled off from the roller ceaselessly. Thus, the production capacity is greatly increased to meet economic and industrial purposes. Generally speaking, the speed of non-woven netting is about one hundred times faster than that of the conventional woven netting.

So far, the newly invented non-woven netting seems similar to the extrusion tubular netting whose production procedure is as follows.

A duplicate die (inner and outer dies) as per FIG. 1, (a) are nozzles in the outer die (A) while (b) are nozzles in the inner die (B). The melted plastic raw materials are extruded from nozzles. Under different rotational directions, (a) and (b) sometimes separate and sometimes meet, so the melted monofilaments from (a) and (b) with the action of separating and meeting are forming the tubular Net. Such tubular Net can only be used as a packing net bag. Its usage is not wide enough because:

(1) The monofilament is not stretched or it is without sufficient stretching, so the tensil strength is weak—not able to carry objects exceeding 10 kilograms.

(2) The diameter of the die is too small, usually it is below 10 cm and even the maximum size is not over 20 cm, so the product is too small—even cut flat, its width is only 60 cm.

(3) Under the different directional movement of the inner die and outer die, friction is often caused and such friction under no-lubricant easily damages the dies, so the consumption rate is heavy and the production cost is comparatively high.

As compared with extrusion tubular netting, this newly invented non-woven netting is advantageous for the following reasons:

(1) Its tensile strength is strong enough.

(2) Its width can reach 2 meters or more.

(3) The melting monofilament is not welded in nozzles but on the roller, so the die is without friction and the damage rate is low.

(1) a first T Die
(1') Another T Die
(1-1) Spreader in T Die
(1-2) Nozzles of T Die
(2) One group of cohesive monofilaments
(2') Another group of cohesive monofilaments
(3) Guide roller with anti-adhesive coating
(3') Another guide roller
(4) Silicone rubber roller for pressure
(4') Another roller for pressure
(5) This invented non-woven netting
(6) One group of arranged yarns
(6') Another group of yarns.
(7) A first reed
(7') Another reed

DETAILED DESCRIPTION OF THE INVENTION

Figure 2:
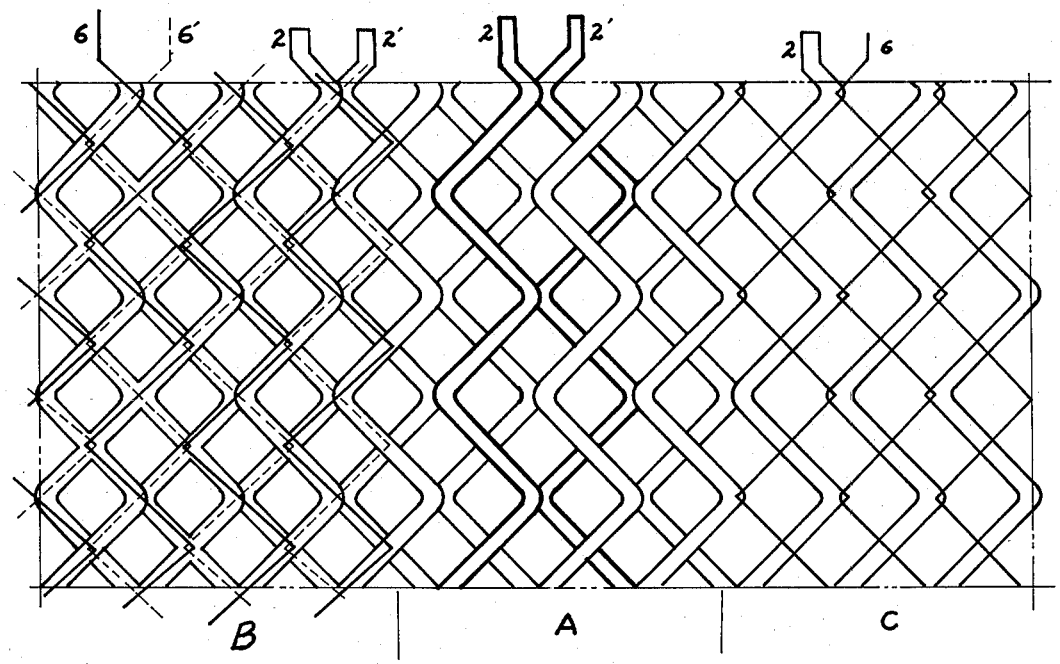
FIG. 2 shows the structure of this invented non-woven netting.

The structure of the netting formed in accordance with the present invention is illustrated in FIG. 2.

One group of horizontal melting monofilaments (2) is crossed and welded with another group of same condition monofilaments (2') to form a wide, plain and welded plastic netting. A certain number of yarns or filaments (6), (6') can be added to be crossed and welded together to increase the tensile strength of the netting. If preferred, only one group of melting monofilaments (2) can be used to cross and welded with only one group of yarns of filaments (§ 0 to form a simple netting.

The netting shown in FIG. 2 may be formed with the apparatus illustrated in FIGS. 3-6.

Figure 3:
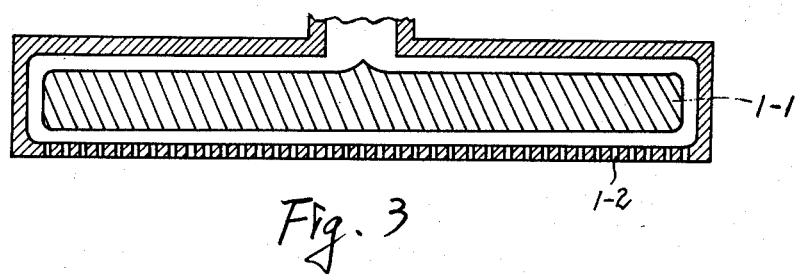
FIG. 3 shows a sectional schematic view of a T Die which may be used to form the melted monofilament of the present invention.
Figure 1:
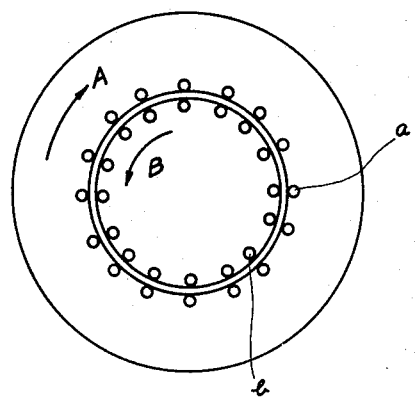
FIG. 1 shows a rotary duplicate die for an extrusion tubular net.
Figure 5:
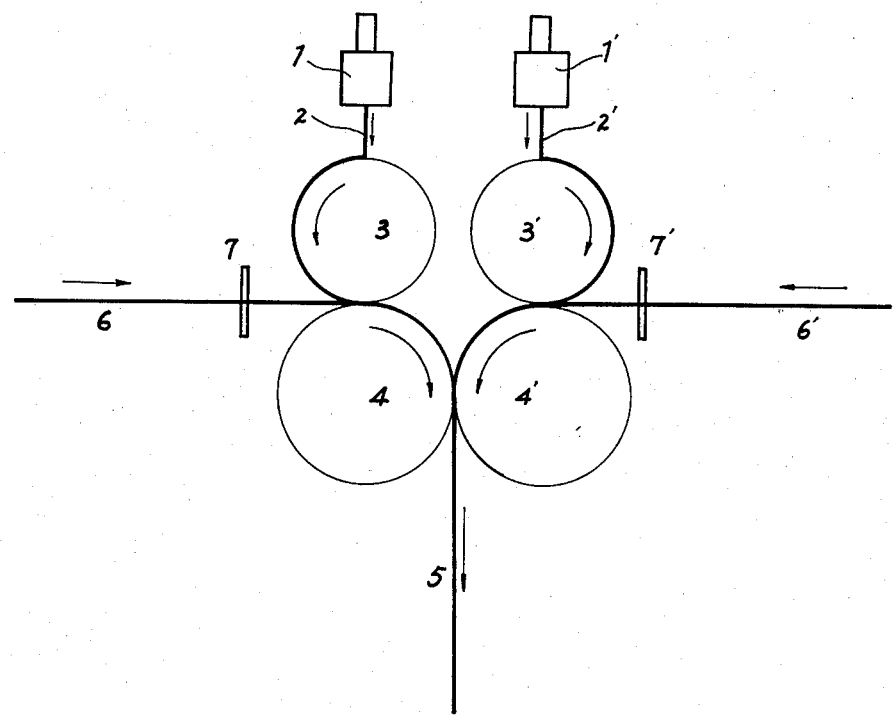
FIG. 5 is a side view of the embodiment shown in FIG. 4.

Referring to FIGS. 3 and 5, T-shaped dies (T Dies) (1) and (1') each include a spreader (1-1) and many holes nozzle (1-2) at same span are capable of producing melting plastic monofilaments (2) or (2') guide rollers with anti-adhesive coating (3) (3') controlled by a groove cam move reciprocatingly in opposite directions to guide those melting monofilaments (2) (2') crossing one another pressure of one pair of silicone rubber rollers (4) (4') pressed and welded those melting monofilaments (2) (2') transferred from rollers (3) and (3') to form the welded non-woven netting.

If necessary, several groups of arranged yarns or filaments (6) and (6') can be led into the reed gauges (7) and (7') to form the netting with strong tensile strength. The reed gauges (7) and (7') controlled by crank or cam are moved in opposite directions reciprocatingly and those yarns or filaments (6) and (6') which are led into (7) and (7') are activated to cross one another. The melting monofilaments (2) and (2') and those yarns (6) (6') under pressure of rollers (4) and (4') are crossed and welded together to form the welded non-woven netting with increased tensile strength.

Figure 4:
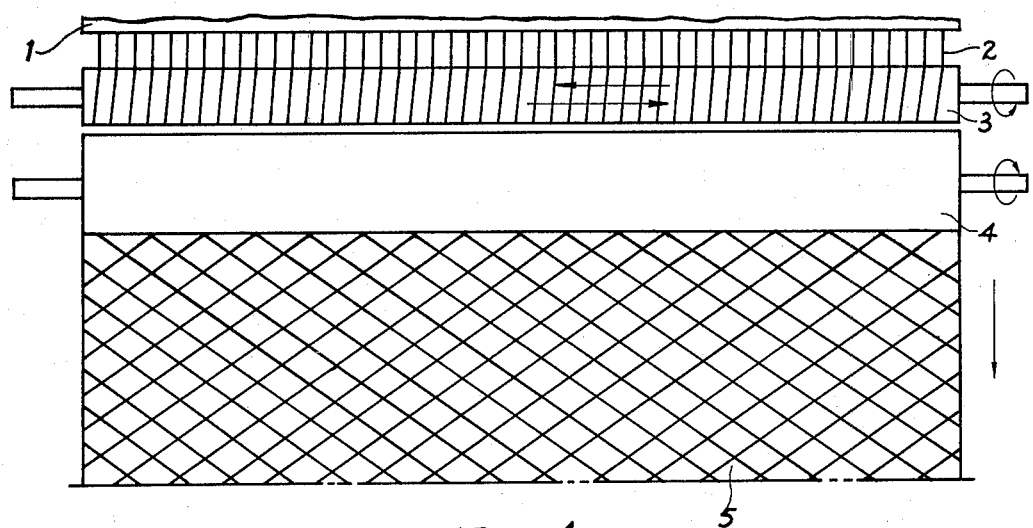
FIG. 4 is a front schematic view of one embodiment of equipment used in the working process of the present invention.
Figure 6:
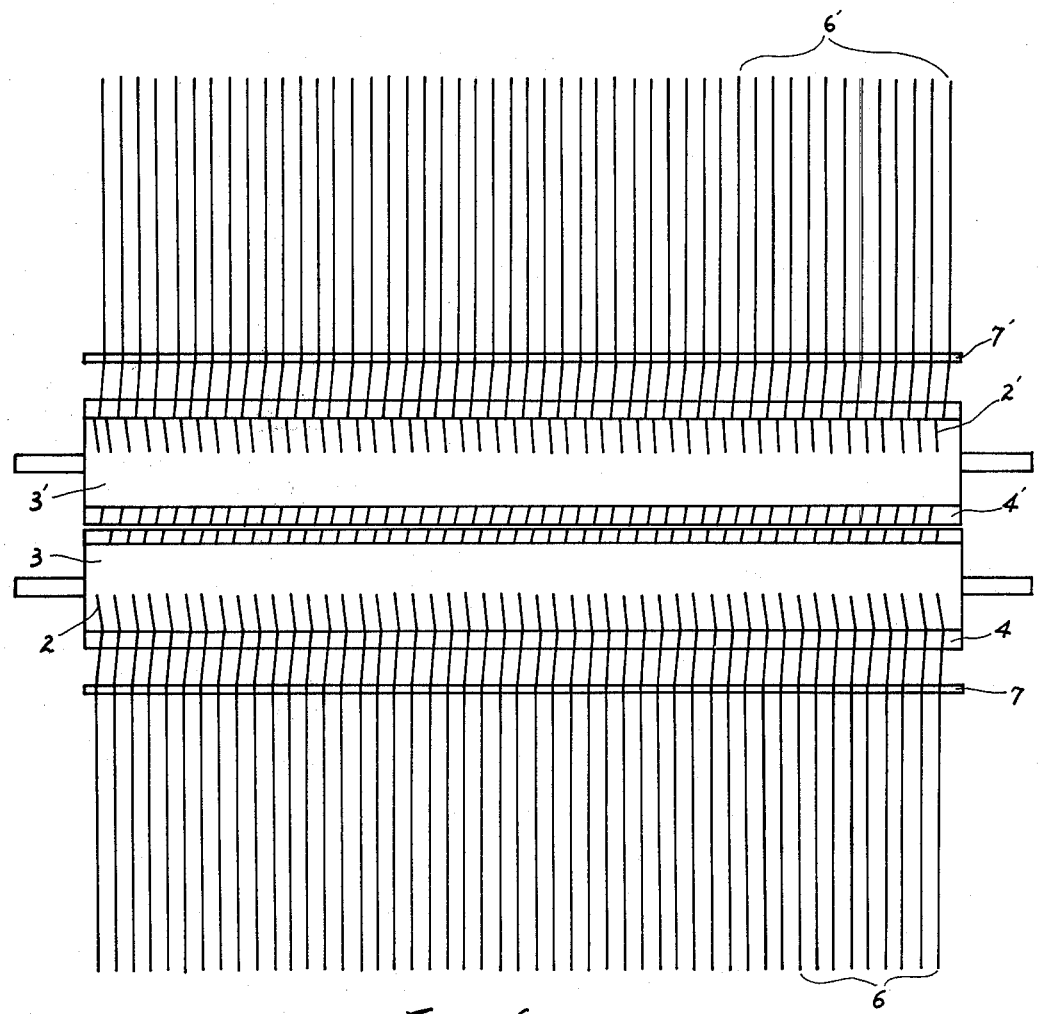
FIG. 6 is a plan schematic view of the embodiment shown in FIGS. 4 and 5.

Operation and Result:

T Dies (1) and (1') on conventional extruders (not shown) and the thermoplastic raw material such as polyethylene, polypropylene, polyvinylchloride, polyamide, polyester, etc. is melted and extruded into T Dies (1) and (1'). The spreader (1-1) then expands the melting plastic evenly within the T Die and then extrudes the material out from nozzles (1-2) begetting monofilaments (2) and (2') under a melting condition. Referring to FIGS. 4, 5 and 6, the monofilaments (2) and (2') vertically land on guide rollers (3) and (3') and, with rollers 3 and 3' oppositely directed reciprocating movement in directions substantially perpendicular to the direction of extrusion of plastic monofilaments (2) and (2'); the melting monofilaments (2) and (2') are activated to be slanted by guide rollers and transferred slantingly to rollers (4) and (4') to be crossed, pressed and welded together to form the required non-woven netting.

If preferred, certain groups of yarn or filament (6) and (6') can be added to be crossed, pressed and welded with the melting monofilaments (2) and (2') to form a strong welded netting in tensile strength. Sometimes, for economic purpose, only one group of melting monofilaments may be used alone to be crossed, pressed and welded with another group of yarn or filament to form a simple welded netting.

I claim:

1. A method for making non-woven plastic netting comprising the steps of:
   (1) extruding in a first direction in a first plane a first plurality of endless linear parallel spaced melted monofilaments;
   (2) feeding a second plurality of spaced endless strands across said first plurality of monofilaments in said first direction in said first plane;
   (3) during said feeding, reciprocally moving at least one of said first plurality of monofilaments and said second plurality of strands in a second direction nonparallel to said first direction in said first plane such that each of said plurality of strands overlaps at least two adjacent monofilaments of said first plurality of monofilaments; and
   (4) following steps 2 and 3, directing said first plurality of monofilaments and said second plurality of strands together between a pair of pressure rollers so as to weld said strands and monofilaments together to form said netting.

2. Method as in claim 1 wherein said second plurality of strands comprise a second plurality of endless linear spaced parallel melted monofilaments.

3. Method as in claim 1 wherein second plurality of strands comprise a second plurality of endless linear spaced parallel yarns.

4. Method as in claim 3 further comprising the step of feeding in said first direction a third plurality of parallel spaced strands of yarn into said first plane so as to cross said first and second pluralities of filaments and be welded thereto during said step of directing.

5. Method as in claim 4 further comprising the step of reciprocally moving said third plurality of strands of yarn in said second direction during said step of feeding said third plurality of strands of yarn so as to overlap said first and second pluralities of monofilaments.

6. A plastic non-woven netting formed by:
   (1) extruding in a first direction in a first plane a first plurality of endless linear parallel spaced melted monofilaments;
   (2) feeding a second plurality of spaced endless strands across said first plurality of monofilaments in said first direction in said first plane;
   (3) during said feeding, reciprocally moving at least one of said first plurality of monofilaments and said second plurality of strands in a second direction perpendicular to said first direction in said first plane such that each of said plurality of strands overlaps at least two adjacent monofilaments of said first plurality of monofilaments; and
   (4) following steps 2 and 3, directing said first plurality of monofilaments and second second plurality of strands together between a pair of pressure rollers so as to weld said strands and monofilaments together to form said netting.

* * * * *